A. H. BASTIAN.
MOTION TRANSLATING MECHANISM.
APPLICATION FILED MAY 16, 1917.

1,254,112.

Patented Jan. 22, 1918.

Inventor
August H. Bastian
by
Attorney

UNITED STATES PATENT OFFICE.

AUGUST H. BASTIAN, OF HILLSDALE, OREGON.

MOTION-TRANSLATING MECHANISM.

1,254,112.  Specification of Letters Patent.  Patented Jan. 22, 1918.

Application filed May 16, 1917.  Serial No. 169,128.

*To all whom it may concern:*

Be it known that I, AUGUST H. BASTIAN, a citizen of the United States, and a resident of Hillsdale, county of Multnomah, State of Oregon, have invented a certain new and useful Improvement in Motion - Translating Mechanism, of which the following is a specification.

The object of my invention is to provide a simple and efficient power transmitting device so arranged as to translate the motion of a rotary member comprised in my mechanism into a reciprocating motion along a path at right angles to the sides of said rotary member, and the general direction of which is parallel to the axis of rotation of the latter.

Figure 1:
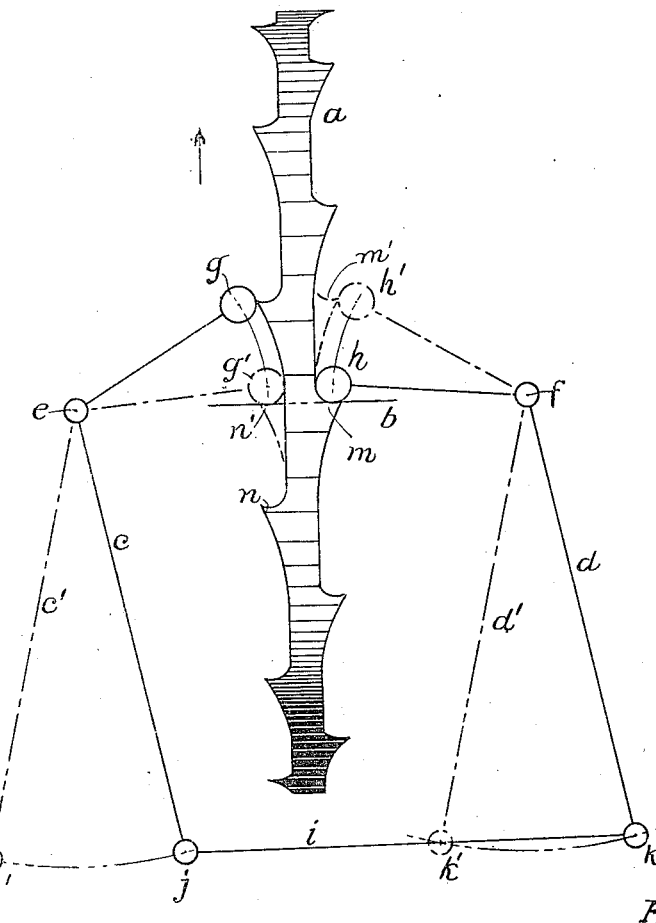
Figure 2:
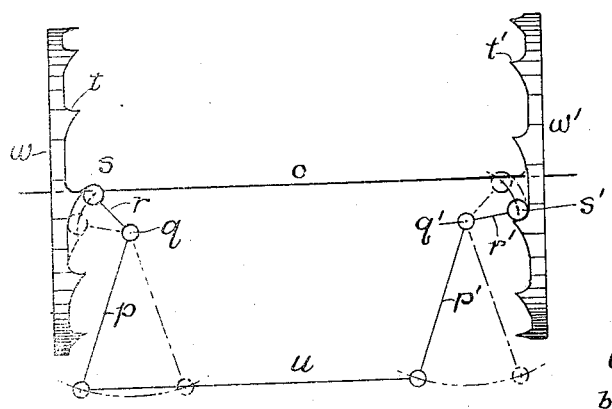

The construction and operation of my device are more readily understood by having reference to the accompanying drawings, each of which represents a diagrammatic illustration of my power translating mechanism, Figure 1 showing one mode in which my device may be arranged; and Fig. 2 showing another form in which the same may be arranged.

$a$ represents the perimeter of a wheel having laterally projecting teeth on both sides of its rim. This wheel is assumed to be rotating about an axis $b$ in the direction indicated by the arrow. $c$ and $d$ are bell-cranks pivoting on centers $e$, $f$. The short arm of each bell-crank carries a friction roller, $g$, and $h$, which engages with said teeth of the wheel, as illustrated. The longer arms of the bell crank are connected together by a link $i$, which is pivotally attached at $j$ and $k$. In this way the link $i$ will be given a movement in a path the general direction of which is parallel to the axis $b$ of the wheel $a$.

The action of my device is as follows: Assume the wheel $a$ to be in motion, in the direction indicated by the arrow, and the different parts positioned as shown by full lines in Fig. 1. Note the roller $h$ of the short arm of the bell crank $d$ has just become engaged by the tooth $m$ of the wheel, thus causing the bell crank $d$ to be rocked into its position $d'$. Due to the described connection of the bell cranks $d$, $c$, and the link $i$, the roller $g$ of the short arm of the bell crank $e$ will begin a downward movement toward the tooth $n$ of the wheel, and at approximately the same velocity as the up movement of the short arm of the bell crank $d$. When the wheel has rotated so that the tooth $n$ is at $n'$, and the tooth $m$ is at $m'$, and the roller $h$ of the short arm of the bell crank $d$ will be at $h'$, and will have become disengaged from the tooth $m$, while the roller $g$ of the short arm of the bell crank $c$ will have moved to $g'$, and have met the tooth $n$. The movements of the bell cranks will now be in directions opposite to that described. In this way the described motion of the bell cranks $c$ and $d$ will swing through the arcs $j$, $j'$ and $k$, $k'$, and in so doing move the link $i$ back and forth in a path having a general direction parallel to the axes $b$ as desired.

In Fig. 2, the wheels $w$, $w'$ rotate about an axis $o$. $p$, $p'$ represent bell cranks pivoted at $q$, $q'$. Each of the shorter arms of said bell cranks, $r$, $r'$ is provided with a roller $s$, $s'$, which engage with the laterally projecting teeth $t$, $t'$ of said wheels $w$, $w'$. The long arms of the bell cranks $p$, $p'$ are connected by a link $u$. As evident, the principle of operation and effect produced by this device, Fig. 2, is like that of the device shown in Fig. 1. In short, the only difference is, that Fig. 2 shows a mechanism employing two wheels the opposed side faces of the rims of which are provided with the tooth-like lateral projections for engaging the short arms of the bell cranks, and the latter are located between said wheels, instead of the parts being arranged as shown in Fig. 1.

I claim:

1. In a mechanism of the character described, the combination of a circular, rotated element provided with oppositely disposed alternating peripheral teeth, duplicate bell-cranks pivoted on axes lying in a plane parallel to the axis of rotation of said rotated element, said bell-cranks comprising each a member engaging with the related teeth of said rotated element, and the other members of said bell-cranks being coupled together, thereby to transmit reciprocating motion in a line whose general direction is parallel to said axis of rotation.

2. In a mechanism of the character described, the combination of a circular, rotated element provided with oppositely disposed alternating peripheral teeth, duplicate bell-cranks pivoted on axes lying in a plane parallel to the axis of rotation of said rotated element, said bell-cranks comprising each a member engaging with the related teeth of said rotated element, the extremity of said member of the bell-crank being provided with anti-friction means, and the other members of said bell-cranks being coupled together, thereby to transmit reciprocating motion in a line whose general direction is parallel to said axis of rotation.

3. In a mechanism of the character described, the combination of a rotated annular member provided with laterally projecting, opposite, alternating peripheral teeth, duplicate bell-cranks pivoted on axes lying in a plane parallel to the axis of rotation of said rotated member, said bell-cranks comprising each a member engaging with the related teeth of said rotated member, and the other members of said bell-cranks being coupled together, thereby to transmit reciprocating motion in a line whose general direction is parallel to said axis of rotation.

4. In a mechanism of the character described, the combination of a rotated annular member provided with laterally projecting, opposite, alternating peripheral teeth, duplicate bell-cranks pivoted on axes lying in a plane parallel to the axis of rotation of said rotated member, said bell-cranks comprising each a member engaging with the related teeth of said rotated member, the extremity of said member of the bell-crank being provided with anti-friction means, and the other members of said bell-cranks being coupled together, thereby to transmit reciprocating motion in a line whose general direction is parallel to said axis of rotation.

AUGUST H. BASTIAN.

Copies of this patent may be obtained for five cents each, by addressing the "Commissioner of Patents, Washington, D. C."